United States Patent [19]

Jensen et al.

[11] 4,447,303
[45] May 8, 1984

[54] METHOD OF SEPARATING BORON ISOTOPES

[75] Inventors: Reed J. Jensen, Los Alamos, N. Mex.; James M. Thorne; Coran L. Cluff, both of Provo, Utah; John K. Hayes, Salt Lake City, Utah

[73] Assignee: The United States of America as represented by the United States Department of Energy, Washington, D.C.

[21] Appl. No.: 228,036

[22] Filed: Jan. 23, 1981

[51] Int. Cl.³ .......................................... B01D 59/00
[52] U.S. Cl. .......................... 204/157.1 R; 204/158 R
[58] Field of Search ................... 204/158 R, 157.1 R

[56] References Cited

U.S. PATENT DOCUMENTS 4,049,515 9/1977 Robinson et al. ............ 204/157.1 R
4,088,553 5/1978 Rockwood ................... 204/157.1 R

OTHER PUBLICATIONS

Jensen et al., "Isotopically Selective Infrared Photodissociation of (Trans-2-Chloroethenyl) Dichloroborane," *IEEE J. Quantum Electron,* 1980, QE16(12), 1352–1356, (Dec. 1980).

Primary Examiner—Deborah L. Kyle
Attorney, Agent, or Firm—Edward C. Walterscheid; Samuel M. Freund; Paul D. Gaetjens

[57] ABSTRACT

A method of boron isotope enrichment involving the isotope preferential photolysis of (2-chloroethenyl)dichloroborane as the feed material. The photolysis can readily be achieved with $CO_2$ laser radiation and using fluences significantly below those required to dissociate $BCl_3$.

12 Claims, 5 Drawing Figures

METHOD OF SEPARATING BORON ISOTOPES

BACKGROUND OF THE INVENTION

The invention described herein relates to a method for separating boron isotopes and more particularly to a method for the laser-induced separation of boron isotopes using (2-chloroethenyl)dichloroborane as the feed material. The U.S. Government has rights in this invention pursuant to Contract W-7405-ENG-36 between the U.S. Department of Energy and the University of California (41 C.F.R. § 9-9.109-6(i)(5)(ii)(B)).

Boron highly enriched in $^{10}$B has substantial utility as a neutronic poison in nuclear reactors. Traditionally, two methods have been used for the separation of $^{10}$B and $^{11}$B. The first depends on the fractional distillation of the dimethyl- or diethyl-ether complex of $BF_3$. The second involves the low temperature fractional distillation of $BF_3$ itself. During the middle part of 1980, the cost of high-purity $^{10}$B powder was $14/g. Only $2/g of that cost was attributable to isotope separation; the remaining cost arose from the necessity of chemically reducing the very stable $BF_3$ used for the separation process to the boron powder needed by the customer. The high cost of chemical reduction arises because it is a tedious process, involving reaction of $BF_3$ with $LiCO_3$ to get $B(OH)_3$, blending with carbon black and furnace firing to get $B_4C$, zone refining to densify, conversion to $BBr_3$, distillation and reduction by $H_2$ to the metal, and then several steps of powder preparation.

It is not surprising therefore that in recent years efforts have been made to develop isotope separation techniques using a different boron-containing feed material than $BF_3$. Thus, for example, the art now teaches that boron isotope separation can be accomplished by isotope-preferential excitation and photodissociation of $BCl_3$. Boron trichloride was thought to be a particularly advantageous feed material in that it has several infrared absorption features corresponding to either $^{10}$B or $^{11}$B which closely match certain lines of the $CO_2$ laser. Because of its efficiency and power, the $CO_2$ laser is a highly preferred source of infrared radiation. Unfortunately, although infrared absorption in $BCl_3$ can indeed be made at least highly isotopically preferential and the excited molecules can be preferentially photodissociated, subsequent chemical reactions tend to significantly limit the efficiency of the process. That is to say, when $BCl_3$ is used as a feed material, chemical scrambling appears to significantly reduce the enrichment factor, $\alpha$, which can be achieved.

Accordingly, it is an object of the present invention to provide a photodissociation process for separating boron isotopes using a feed material other than $BCl_3$.

Another object of the present invention is to provide a photodissociation process for the separation of boron isotopes wherein the isotope selective or at least preferential excitation can be provided by infrared radiation from a $CO_2$ laser.

Another object of the present invention is to provide a photodissociation process for the separation of boron isotopes having a higher enrichment factor, $\alpha$, than prior art photodissociation processes.

Yet another object of the present invention is to provide a photodissociation process for the separation of boron isotopes which is readily amenable to staging.

Finally, still another object of the present invention is to provide a photodissociation process for boron isotope separation having a reduced laser intensity requirement over that taught in prior art photodissociation processes.

Additional objects, advantages, and novel features of the invention will be set forth in part in the description which follows, and in part will become apparent to those skilled in the art upon examination of the following, or may be learned by practice of the invention. The objects and advantages of the invention may be realized and attained by means of the instrumentalities and combinations particularly pointed out in the appended claims.

SUMMARY OF THE INVENTION

In its broad aspect, the invention encompasses a method of enriching boron in a particular isotope thereof by irradiating gaseous $HClC=CHBCl_2$ containing both boron isotopes with radiation of a wavelength which at least preferentially excites those molecules containing a particular boron isotope. The fluence of the radiation is chosen to be sufficient to photodissociate those molecules thus excited. The photodissociation products produced by the irradiation are then separated from the undissociated $HClC=CHBCl_2$. It will be apparent that the boron-containing photodissociation product will be enriched in the particular boron isotope while the undissociated $HClC=CHBCl_2$ is depleted in that isotope.

Preferably, the irradiation is accomplished with infrared radiation from a $CO_2$ laser. Moreover, in a preferred embodiment, the fluence of the $CO_2$ laser radiation, while sufficient to at least preferentially photodissociate those $HClC=CHBCl_2$ molecules containing a particular boron isotope, is not sufficient to dissociate the product $BCl_3$ formed by the dissociation of the $HClC=CHBCl_2$.

The method of the invention is particularly advantageous in that with it a higher enrichment factor for boron is achieved than is taught for prior art photodissociation techniques for boron isotope separation or enrichment. In addition, the enrichment can be achieved using fluences that are substantially below those required to dissociate $BCl_3$ which is the typical feed material of choice in prior art techniques or methods.

BRIEF DESCRIPTION OF THE DRAWINGS

The accompanying drawings, which are incorporated in and form a part of the specification, illustrate an embodiment of the present invention and, together with the description, serve to explain the principles of the invention. In the drawings.

DESCRIPTION OF THE PREFERRED EMBODIMENT

Figure 1:
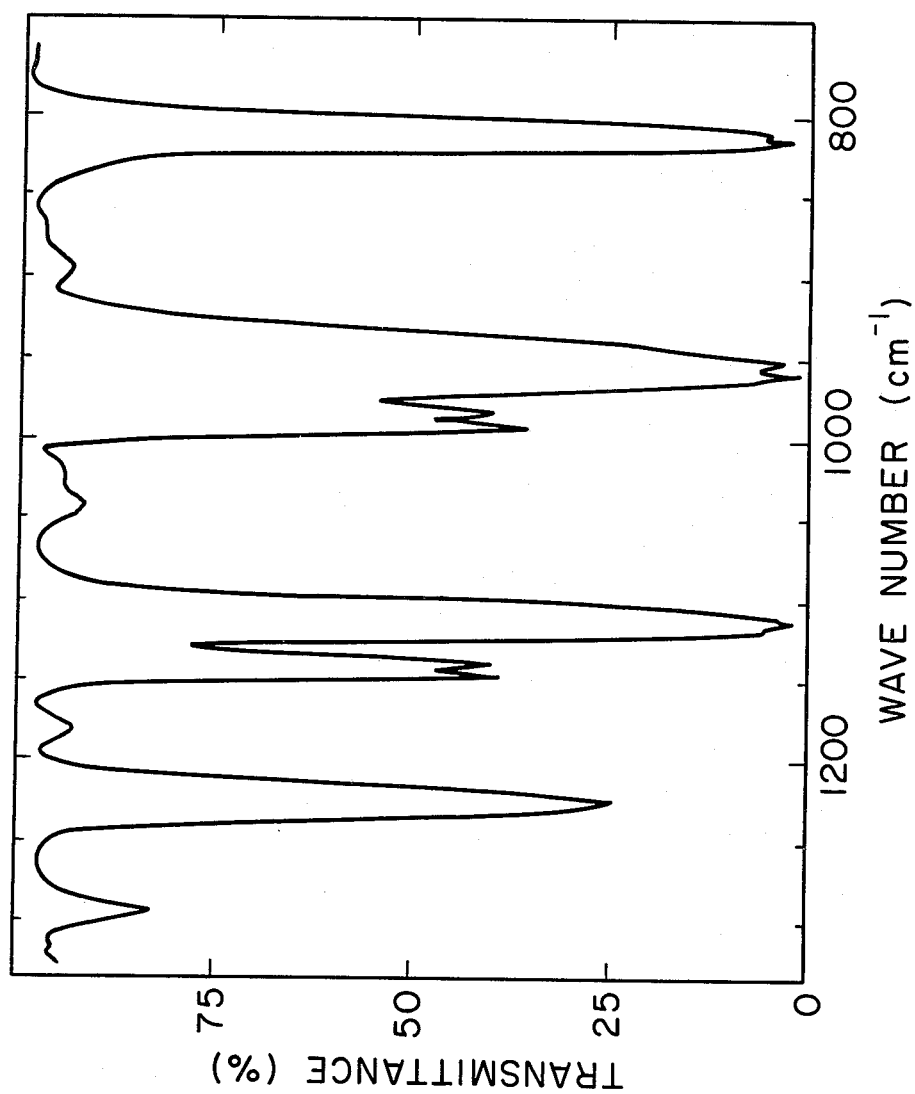
FIG. 1 is a Fourier-transform infrared spectrum of trans-(2-chloroethenyl)dichloroborane.

The process of the present invention is predicated on the use of (2-chloroethenyl)dichloroborane, containing preferably a natural abundance of boron isotopes as the feedstock or feed material. This compound, which has the chemical formula HClC=CHBCl$_2$, is not presently commercially available, although its synthesis was first described by H. A. Arnold in U.S. Pat. No. 2,402,589, which is hereby incorporated by reference for all that it teaches. Two possible modes for laser-induced enrichment of a specific boron isotope are presented by this compound: isotopically selective photodissociation or photoisomerization about the carbon-carbon double bond.

In the runs hereinafter described, the fed material was prepared by a modification of the method of Arnold to allow synthesis of the (2-chloroethenyl)dichloroborane at atmospheric pressure. The gaseous starting materials, $C_2H_2$ and $BCl_3$, were mixed in a two-to-one mole ratio in a stream of dry nitrogen after the $C_2H_2$ has been stripped of acetone by a dry ice-isopropyl alcohol slush bath. The mixture then entered a reactor constructed from 45 cm of 22-mm diameter Pyrex tubing packed with a catalyst of mercurous chloride on 4-12 mesh activated charcoal. The reactor was held at 150° C., and a clear liquid product was collected at −78° C. This material was later purified by trap-to-trap condensation at successive temperatures of −22.5, −45, and −78° C. The purified product is indefinitely stable at room temperature when stored under its own vapor pressure in sealed glass tubes. It is very reactive toward moisture. Hydrolysis by water or aqueous acid yields HCl gas, while reaction with aqueous potassium hydroxide gives a clear solution and a gas with an infrared spectrum which identifies it as acetylene.

Measurements of several physical properties indicate that the compound thus prepared was relatively pure. The melting point was measured to be −92.5°±0.5° C., with the narrow range suggesting good purity. The compound has a strong tendency to supercool by as much as 4° C. below the equilibrium freezing point. The vapor pressure of 56.1 torr at 28.7° C. is in good agreement with the value of 58 torr reported by Arnold. At this pressure and temperature the vapor density corresponds to a molecular weight of 145.2. This is slightly larger than the value of 143.2 expected for pure HClC=CBCl$_2$ and is probably a result of small amounts of impurities, such as bis(2-chloroethenyl)chloroborane which has nearly twice the molecular weight of the desired compound. If such high molecular weight impurities were present, their concentrations were too low for detection in a mass spectrometer. However, as shown in Table I, the mass spectrum did confirm the identity of the (2-chloroethenyl)dichloroborane. Based on a dipole moment determination, it appears that at the synthesis temperature of 150° C., this method of preparation yields the thermodynamically stable trans isomer of HClC=CBCl$_2$.

TABLE I

MASS SPECTRUM OF HClC=CHBCl$_2$

| Mass | Relative Abundance Expected | Relative Abundance Observed |
|---|---|---|
| 141 | 23.2 | 23.4 |
| 142 | 100.0 | 100.0 |
| 143 | 24.9 | 25.8 |
| 144 | 97.5 | 98.0 |
| 145 | 9.4 | 10.0 |
| 146 | 31.7 | 30.6 |
| 147 | 1.5 | 1.8 |
| 148 | 3.4 | 3.4 |
| 149 | 0.1 | 0.2 |

A Fourier-transform infrared spectrum revealed the absorption bands listed in Table II. Bands near $CO_2$ laser emissions are reproduced in FIG. 1. The tentative band assignments in Table II are based on the assignments of the similar compounds 1,2-bis(dichloroboryl)ethylene, E(2-phenyl-2-chloroethenyl)dichloroborane, and boron trichloride. The adsorptions at 960 and 990 cm$^{-1}$ probably arise from B-Cl stretching vibrations of the $^{11}BCl_2$ and $^{10}BCl_2$ moieties, respectively. These absorptions are very similar in appearance and frequency to the $\nu_3$ frequency in $BCl_3$ but are less intense and appear as poorly resolved doublets. The peaks at 1112 and 1137 cm$^{-1}$ probably arise from $^{11}$B-C and $^{10}$B-C stretching. The peak at 1627 cm$^{-1}$ probably arises from C=C stretching and suggests delocalization of electron density from the C=C bond into the C-B bond.

A Lumonics CO$_2$ TEA laser (model 102) was used in the irradiation experiments. The irradiation cell was a brass cylinder (2.5 cm i.d.×7.5 cm) fitted with NaCl windows and valve and pressure gauge ports. An MKS Baratron gauge was used to monitor the pressure in the cell. It was brought to 3 torr at the beginning of each experiment. At the cell the laser-beam cross section was 1 cm×1.5 cm. Laser pulse energy (usually less than one joule) was measured using a cone joulemeter.

When irradiated with a CO$_2$ laser tuned to the 950 to 1000 cm$^{-1}$ portion of the spectrum, trans-(2-chloroethenyl)dichloroborane (1-10 torr) dissociated to $BCl_3$ gas and $C_2H_2$ gas, the compounds from which it was synthesized. The resulting $BCl_3$ absorbs virtually the same frequencies as does the asymmetric B-Cl stretch in HClC=CHBCl$_2$. The absorption of the former is much stronger, consequently absorption by the 960 and 990 cm$^{-1}$ regions increases as $^{11}BCl_3$ and $^{10}BCl_3$

TABLE II

TENTATIVE BAND ASSIGNMENTS AND SPECTROSCOPIC DATA

| Molecule | Band Center (cm$^{-1}$) | Relative Strength | Tenative Band Assignment | Change Upon Dissociation |
|---|---|---|---|---|
| C$_2$H$_2$BCl$_3$ | 615 | m | | (blank) |
| C$_2$H$_2$BCl$_3$ | 816 | s | | decrease |
| C$_2$H$_2$BCl$_3$ | 960 | s | $\nu_{as}^{11}BCl_2$ | |
| C$_2$H$_2$BCl$_3$ | 992 | m | $\nu_{as}^{10}BCl_2$ | increase |
| C$_2$H$_2$BCl$_3$ | 1113 | s | $^{11}$B-C stretch | decrease |
| C$_2$H$_2$BCl$_3$ | 1147 | m | $^{10}$B-C stretch | decrease |
| C$_2$H$_2$BCl$_3$ | 1226 | s | | |
| C$_2$H$_2$BCl$_3$ | 1572 | vs | | |
| BCl$_3$ | 957 | | $\nu_3^{11}BCl_3$ | increase |
| BCl$_3$ | 994 | | $\nu_3^{10}BCl_3$ | increase |

Conversely, the absorption in the B-C stretch region of HClC=CHBCl$_2$ decreases as the concentration of these molecules is decreased through photodissociation, and relative changes can be used to detect isotopic enrichment in the starting material. These expected changes are summarized in the last column of Table II. Before and after laser irradiation, the absorbance was observed using a Beckman IR-7 spectrophotometer operated in the single beam mode. In this mode, absorptivity can be used to calculate partial pressures in the range 0.26 to 7.62 torr with less than 2% error for either isotopic composition of $BCl_3$ or $HClC≡CHBCl_2$.

Figure 2:
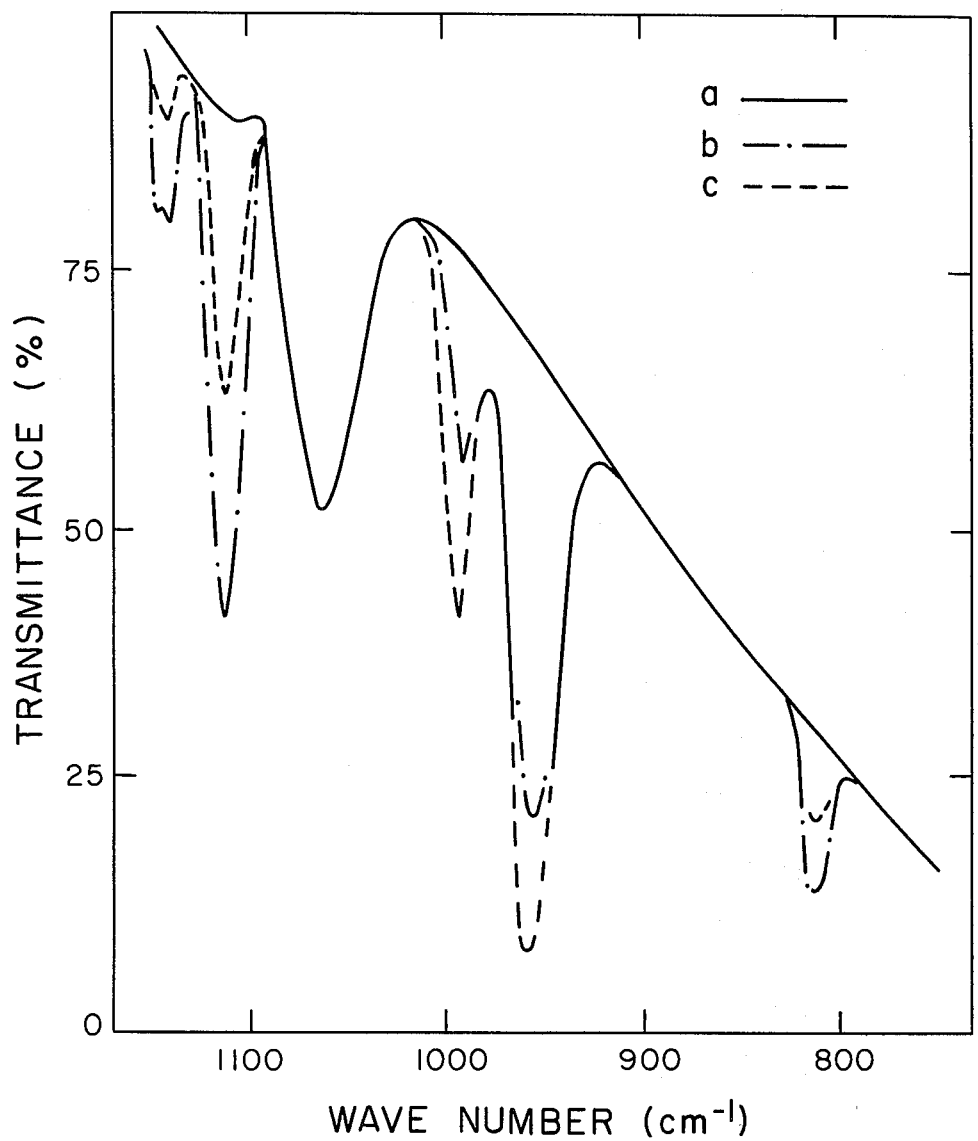
FIG. 2 shows the single beam infrared spectra obtained in the irradiation cell under the following conditions: (a) the evacuated cell, (b) 2.90 torr $C_2H_2BCl_3$ before irradiation; (c) the sample after irradiation with sixteen 0.9 J pulses with a $CO_2$ TEA laser. The arrow indicates the laser output frequency.

FIG. 2 shows infrared spectra before and after irradiation by sixteen 0.9 J pulses at 935 cm$^{-1}$ using the P(30) 00°1–10°0 line of the laser. Spectrum (a), was recorded with the cell evacuated, spectrum (b) is of 2.90 torr of $HClC≡CHBCl_2$ before irradiation, and (c) is the spectrum after irradiation. The absorption at 1060 cm$^{-1}$ is atmospheric. The fraction of $HClC≡CHBCl_2$ molecules containing $^{10}B$ was increased from the natural abundance of 18.4±0.7% to 24.4±2.2% by the sixteen 0.9 J pulses. The $^{11}B$-containing molecules were preferentially dissociated. Fractional conversions of $HClC≡CH^{10}BCl_2$ and $HClC≡CH^{11}BCl_2$ were 0.56±0.04 and 0.68±0.02, respectively, in this example. The $^{11}B$ elementary separation factor for this example is 1.67. In this first example, the laser frequency was tuned to the $\nu_{as}$ $^{11}BCl_3$ absorption (935 cm$^{-1}$) and selective dissociation of $^{11}B$-containing molecules was expected.

In a second example, at 986 cm$^{-1}$ (R(38) 00°1–10°0), where the frequency is tuned to the $\nu_{as}$ $^{10}BCl_2$ vibration, 23.8±4.7% of the $^{10}B$-containing molecules and 15.1±3.4% of $^{11}B$-containing molecules were dissociated after two hundred 0.7 J pulses, showing that the $^{10}B$-containing molecules can also be preferentially dissociated. The $^{10}B$ separation factor was 1.76 for this second example.

Correspondence between laser frequency and peak assignment did not always produce the expected result, however. Contrary to expectation, irradiation at 941 cm$^{-1}$ (P(24) 00°1–10°0) dissociated 84±4% of $^{10}B$ and 77±1% of $^{11}B$-containing molecules in twenty laser pulses. This suggests that the absorption spectrum is more complex than tentative assignments indicate. This complexity is also indicated by the absorptions at 816, 960, 992, 1112, and 1194 cm$^{-1}$ which appear as poorly resolved doublets in the FTIR spectrum (FIG. 1).

At the fluences used in these examples absorption by the products, $C_2H_2$ and $BCl_3$, does not affect the process of the invention. Acetylene does not absorb in this region of the spectrum and boron trichloride requires higher fluence and/or more laser pulses to dissociate appreciably. One hundred 0.6 J pulses at 953 cm$^{-1}$ did not change the pressure or spectrum of 2.85 torr of pure $BCl_3$. Under the same conditions, six pulses dissociated 34 percent of trans-(2-chloroethenyl)-dichloroborane. The art teaches the irradiation of $BCl_3$ and $C_2H_2$ mixtures produces HCl, but none was observed in these examples.

More quantitatively, the reaction probability, P(φ), was calculated to be 0.1 from the following measured data: fifteen 1.0 J pulses in the 960 cm$^{-1}$ absorption band which were relatively homogeneous (from a highly multimoded, nearly collimated beam) over 1.5 cm$^2$ cross-sectional area of the 7.5 cm cell increased the pressure from 2.57 to 3.25 torr. The pulse length was standard for a Lumonics 102 laser with a gas mix that maximized output energy. It contained an 80–100 ns spike with a 0.5- to 0.8 μs tail. The laser was probably self-modelocked.

The examples set forth herein indicate an enrichment factor of 1.76 for $^{10}B$ and 1.67 for $^{11}B$. While relatively modest, these values are nonetheless higher than the prior art teaches has been achieved using $BCl_3$ as the feed material. Moreover, using $HClC≡CHBCl_2$, a significant enrichment of boron isotopes with a vastly reduced photon requirement from that of the $BCl_3$ case can be achieved.

For several reasons, it is likely that the enrichment factor can be significantly increased in the process of the present invention. It is not clear from the examples set forth herein just what proportion of the radiation was absorbed by each isotopic species. Indeed, the observation of $^{10}B$ enrichment where $^{11}B$ enrichment was expected indicates that the spectrum is not easily interpreted. Thus, a more judicious choice of irradiation wavelength may well produce isotope selective or more highly preferential excitation with a concomitant increase in the enrichment factor.

Alternatively, the photodissociation may have produced reactive fragments (e.g., H.) which went on to react with other molecules without regard to their isotopic composition. Evidence that this in fact occurred (at least with 951 cm$^{-1}$ radiation) is provided by the high quantum yield: the energy absorbed was only one-sixth that required to break a C—H bond in each of the molecules that dissociated. The implication is that some of the molecules absorbed far more than the average number of photons (enough to break one of the bonds), and that the reactive fragment started a chain reaction that required no additional photons. This significantly affects the enrichment factor in that only the first step in such a chain is isotopically selective.

The problems associated with such chain reactions may be substantially minimized through the use of an appropriate scavenger which quickly reacts with free radicals or other reaction fragments. Any such scavenger should be gaseous and substantially nonreactive with $HClC≡CHBCl_2$, $BCl_3$, and $C_2H_2$ at the temperatures of interest. Moreover, it should not absorb any significant amount of the infrared radiation. Scavengers which meet these criteria include $O_2$, $Cl_2$, CO and others.

Figure 3:
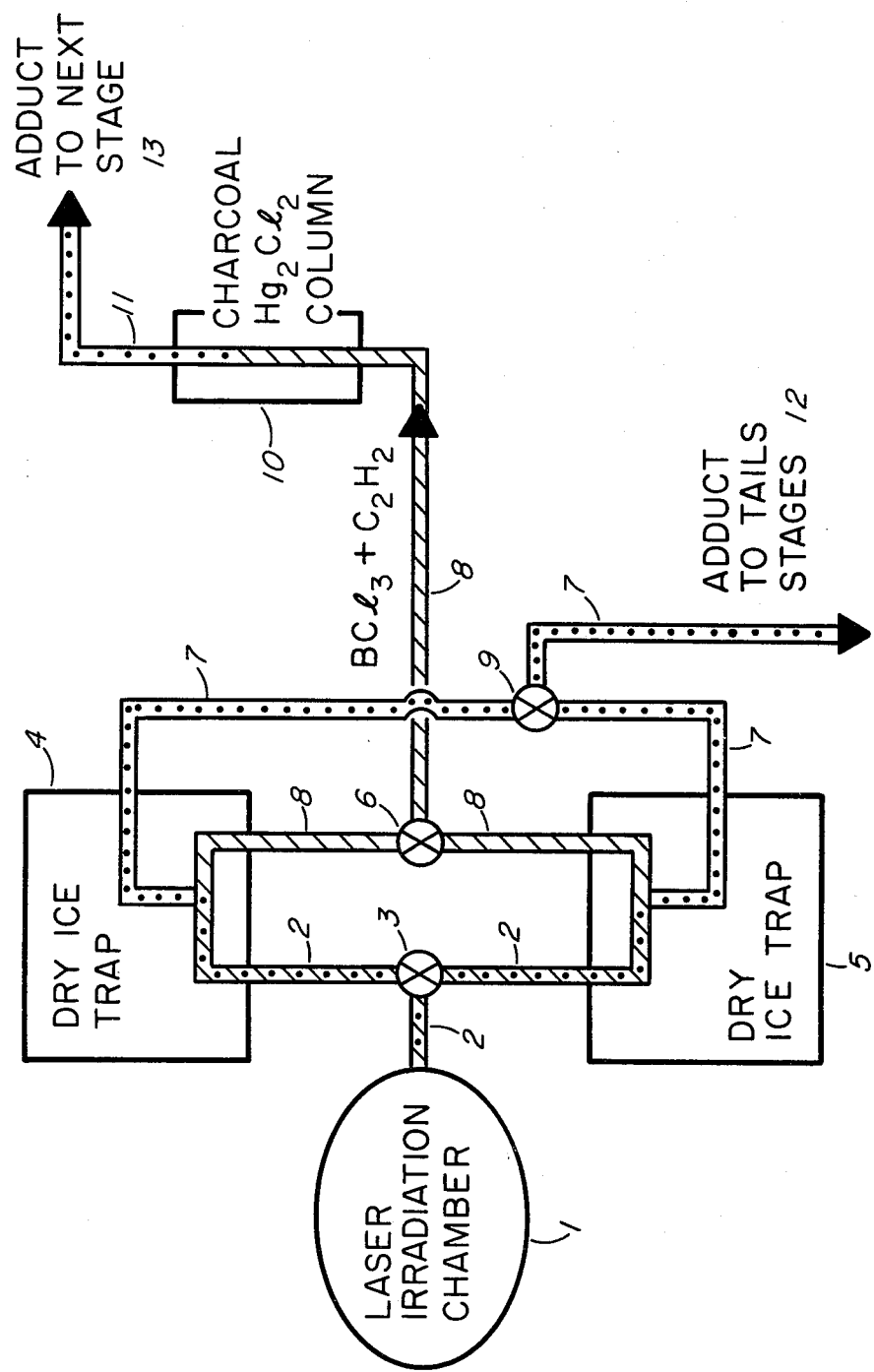
FIG. 3 is a schematic of a typical interstage processing arrangement useful in a cascaded laser-induced photodissociation process for the separation of boron isotopes in accordance with the present invention.

The enrichment process using $HClC≡CHBCl_2$ as the feed material readily lends itself to staging because of the simplified staging chemistry that arises from the simple catalyzed addition reaction of $BCl_3$ and $C_2H_2$ that is exactly the reverse of the decomposition reaction induced by the laser radiation. FIG. 3 shows an interstage process arrangement useful in the preferred embodiment of the invention. Reaction mixture 2 passes from irradiation chamber 1 and is directed by means of valve 3 into one of two dry ice traps 4, 5 where the unreacted $HClC≡CHBCl_2$ is condensed and thereafter discharged into stream 7 and fed through valve 9 into the tails stages 12 for further stripping. Continuous operation is readily achieved by routing mixture 2 into one trap 4 while the other trap 5 is being warmed and discharged, and vice versa. The stream 8 of dissociation products $BCl_3$ and $C_2H_2$ is routed by valve 6 into heated catalysis column 10 containing mercurous chloride on activated charcoal where recombination occurs to once again produce adduct stream 11 of $HClC≡CHBCl_2$ which is fed to the next stage 13 for further enrichment. The recombination is easily repeated between stages because the free energy required for each cycle is provided by the laser irradiation itself.

TABLE III is a flow table for a 14-stage $^{10}$B cascaded enrichment plant that assumes a modest enrichment factor, $\alpha=2$. The cut is adjusted to obtain an ideal cascade.

TABLE III

CASCADE SUMMARY

| Stage | Type | Total Flow (kg/day) | Cut (%) | Assay Feed | Assay Heads | Assay Tails |
|---|---|---|---|---|---|---|
| 1 | Feed | 88.02 | 44.6 | 0.184 | 0.242 | 0.138 |
| 2 | Strip | 64.55 | 43.8 | 0.138 | 0.184 | 0.101 |
| 3 | Strip | 36.19 | 43.2 | 0.101 | 0.138 | 0.074 |
| 4 | Enrich | 66.50 | 45.6 | 0.242 | 0.311 | 0.184 |
| 5 | Enrich | 51.35 | 46.8 | 0.311 | 0.389 | 0.242 |
| 6 | Enrich | 40.10 | 48.1 | 0.389 | 0.474 | 0.311 |
| 7 | Enrich | 32.28 | 49.6 | 0.474 | 0.561 | 0.389 |
| 8 | Enrich | 26.41 | 51.0 | 0.561 | 0.643 | 0.474 |
| 9 | Enrich | 22.01 | 52.5 | 0.643 | 0.718 | 0.561 |
| 10 | Enrich | 18.58 | 53.7 | 0.718 | 0.783 | 0.643 |
| 11 | Enrich | 15.65 | 54.9 | 0.783 | 0.836 | 0.718 |
| 12 | Enrich | 12.71 | 55.8 | 0.836 | 0.878 | 0.783 |
| 13 | Enrich | 9.29 | 56.5 | 0.878 | 0.911 | 0.836 |
| 14 | Enrich | 5.38 | 57.0 | 0.911 | 0.935 | 0.878 |

Figure 4:
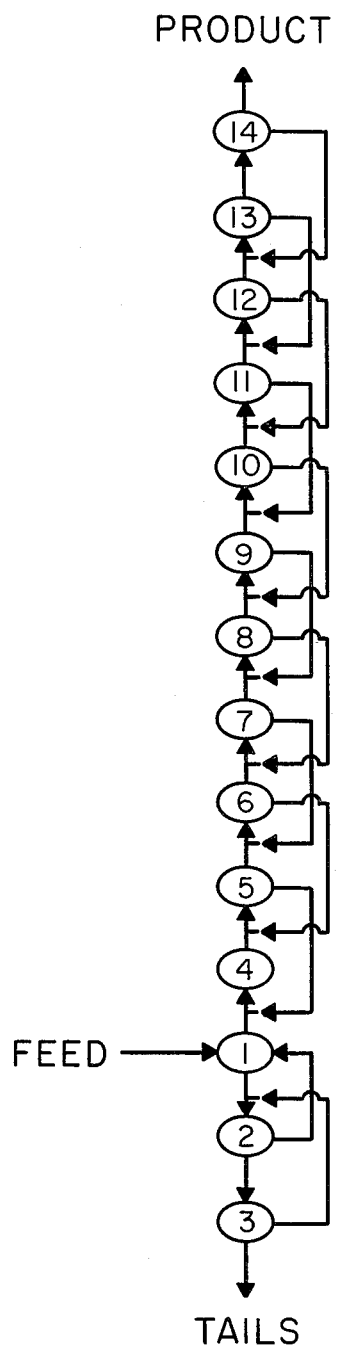
FIG. 4 is a schematic representation of an enrichment cascade in accordance with the present invention with separation factor, $\alpha=2$.

The flows will produce 3 kg/day of 93.5% $^{10}$B product. The 14-stage cascade is shown schematically in FIG. 4.

Figure 5:
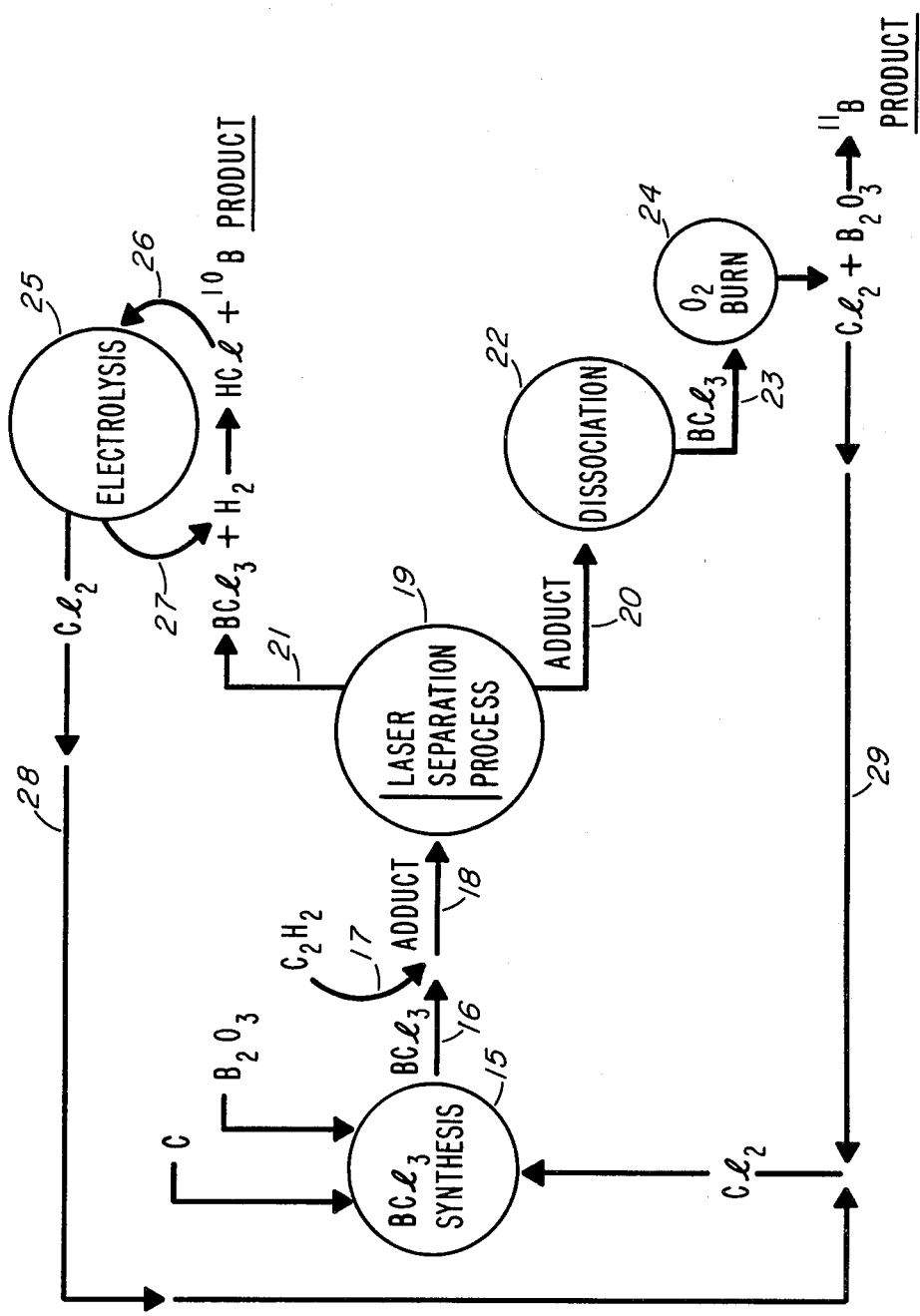
FIG. 5 is a schematic process flow sheet for a laser-induced photodissociation process for the separation of boron isotopes in accordance with the present invention.

As shown by the process flow sheet of FIG. 5, separation of boron isotopes in accordance with the invention has the additional attractive feature of permitting chlorine to be recycled, thereby reducing the consumption of chemicals in the overall process. The hydrogen can also be recycled by the facile electrolysis of HCl. In FIG. 5, the BCl$_3$ synthesis 15 is accomplished by standard techniques well known in the chemical processing arts. The boron used in this synthesis contains a natural abundance of boron isotopes, i.e., ~18% of $^{10}$B and ~82% of $^{11}$B. The product BCl$_3$ 16 and acetylene 17 are reacted in the manner hereinbefore described to form the HClC≡CHBCl$_2$ adduct 18 which serves as the feed material for laser separation process 19. Process 19 preferably encompasses a plurality of stages utilizing interstage processing of the type shown in FIG. 3.

As set forth in FIG. 5, laser separation process 19 produces a dissociation product BCl$_3$ 21 which is enriched in $^{10}$B and an undissociated adduct 20 which is accordingly enriched in $^{11}$B. It will be understood that by appropriate choice of infrared wavelength, the product BCl$_3$ 21 can be enriched in $^{11}$B and the undissociated adduct 20 enriched in $^{10}$B. Whatever the product BCl$_3$ 21 is enriched in, the undissociated adduct 20 is depleted in. In either case, the product BCl$_3$ 21 is readily reacted with hydrogen to give HCl and metallic boron enriched in the desired isotopic species. The product HCl 26 undergoes electrolysis 25 to produce hydrogen which is recycled 27 to react with product BCl$_3$ 21 and chlorine which is recycled 28 to BCl$_3$ synthesis 15.

Adduct 20 remaining after the laser separation process 19 is completed is then made to undergo dissociation to produce BCl$_3$ 23. Dissociation 22 may be thermal or nonthermal, e.g., photodissociation. If photodissociation is used, the radiation may be isotope preferential or even selective, but there is no necessity for this if adduct 20 has the desired degree of enrichment. It will be readily apparent that the same laser used in the separation process 19 may be used in dissociation 22. The BCl$_3$ product 23 produced by dissociation 22 is reacted with oxygen 24 to produce chlorine 29 which is recycled to BCl$_3$ synthesis 15 and B$_2$O$_3$ which is reduced by any standard technique to produce metallic boron enriched in a particular boron isotope ($^{11}$B as shown in FIG. 5).

The foregoing description of preferred embodiments of the invention has been presented for purposes of illustration and description. It is not intended to be exhaustive or to limit the invention to the precise form disclosed, and obviously many modifications and variations are possible in light of the above teaching. These embodiments were chosen and described in order to best explain the principles of the invention and its practical application to thereby enable others skilled in the art to best utilize the invention in various embodiments and with various modifications as are suited to the particular use of the invention as set forth herein. This description sets forth the best mode presently contemplated for the practice of the invention. Finally, it is intended that the scope of the invention be defined by the claims appended hereto.

What is claimed is:

1. A method of enriching boron in a particular isotope thereof which comprises:
    (a) irradiating gaseous HClC≡CHBCl$_2$ containing both boron isotopes with radiation of a wavelength which at least preferentially excites those molecules containing a particular boron isotope and a fluence sufficient to photodissociate those molecules thus excited, and
    (b) separating the undissociated HClC≡CHBCl$_2$ from the products of said photodissociation.

2. The method of claim 1 wherein said radiation is infrared radiation.

3. The method of claim 2 wherein said radiation is in the range of 1300 to 800 cm$^{-1}$.

4. The method of claim 3 wherein said radiation is from the P or R branch lines of a CO$_2$ laser.

5. The method of claim 1 wherein said fluence is not sufficient to produce any substantial dissociation of BCl$_3$ produced by the photodissociation of said HClC≡CHBCl$_2$.

6. The method of claim 1 wherein the BCl$_3$ and C$_2$H$_2$ formed by the photodissociation of said HClC≡CHBCl$_2$ are recombined to form HClC≡CHBCl$_2$ enriched in said particular isotope and said enriched HClC≡CHBCl$_2$ is again staged through steps (a) and (b) of claim 1.

7. The method of claim 1 wherein the undissociated HClC≡CHBCl$_2$ depleted in said particular isotope is again staged through steps (a) and (b) of claim 1.

8. The method of claim 7 wherein said staging is cascaded until a desired degree of enrichment of said particular isotope is obtained.

9. The method of claim 8 wherein the BCl$_3$ formed in the final stage of the cascade is reduced to provide boron metal enriched in said particular isotope.

10. The method of claim 9 wherein said BCl$_3$ is reduced by reaction with H$_2$.

11. The method of claim 10 wherein the HCl formed by the reaction of said BCl$_3$ with H$_2$ is electrolyzed and the product Cl$_2$ recycled for use in the synthesis of natural BCl$_3$ used to form feed HClC≡CHBCl$_2$ containing a natural abundance of boron isotopes.

12. The method of claim 8 wherein the HClC≡CHBCl$_2$ depleted in said particular isotope which exits the final stage of the cascade is dissociated to form BCl$_3$ depleted in said particular isotope, said depleted BCl$_3$ is converted to B$_2$O$_3$, the Cl$_2$ formed during said conversion is recycled for use in the synthesis of natural BCl$_3$ used to form feed HClC≡CHBCl$_2$ containing a natural abundance of boron isotopes, and the B$_2$O$_3$ is reduced to metallic boron depleted in said particular isotope.

* * * * *